Patented Oct. 9, 1923.

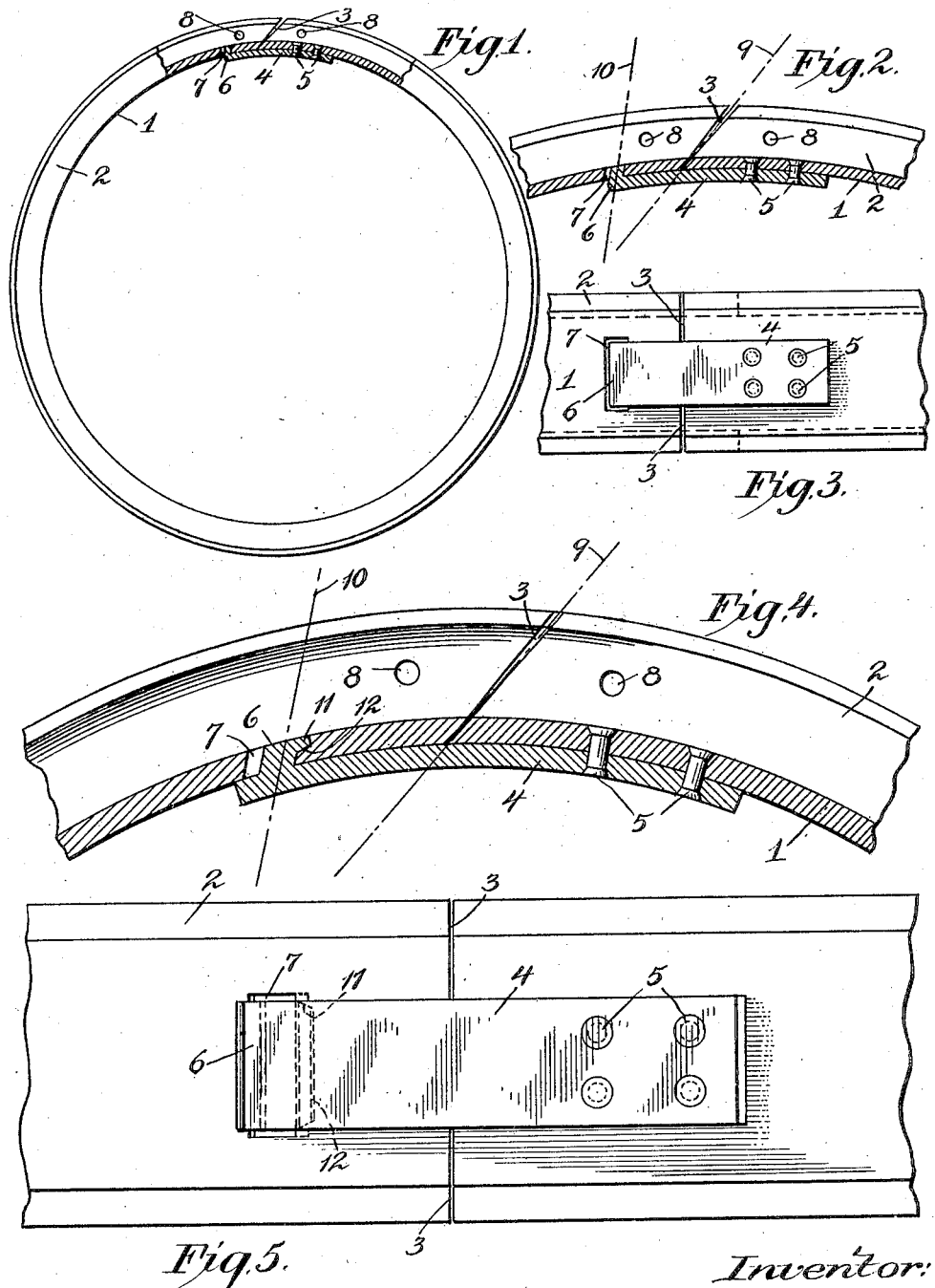

1,470,240

UNITED STATES PATENT OFFICE.

FREDELLIA H. MOYER, OF JOHNSTOWN, PENNSYLVANIA.

DEMOUNTABLE RIM FOR VEHICLE WHEELS.

Continuation in part of application Serial No. 770,314, filed May 28, 1913. This application filed September 14, 1917. Serial No. 191,474.

*To all whom it may concern:*

Be it known that I, FREDELLIA H. MOYER, a citizen of the United States, and a resident of Johnstown, in the county of Cambria and State of Pennsylvania, have invented certain new and useful Improvements in Demountable Rims for Vehicle Wheels, of which the following is a specification.

The invention relates to improvements in demountable rims for vehicle wheels and has particular reference to a one piece rim provided with tire retaining beads and split transversely of its body thereof, from one side or edge to a point opposite on its rear side or edge, said split being on a pre-determined angular plane, one end of said rim adjacent said split having riveted thereto on its under side a plate provided at its end with a hook, bent upwardly at an angle greater than the angle of said split, said hook being arranged to engage a slot in the opposite end of said rim adjacent said split having side walls corresponding in angular inclination with the angular disposition of said hook.

The object of the invention is to provide a split one piece rim having associated therewith means arranged to prevent the separation of said rim at said split in any direction.

Matter shown, described and claimed herein constitutes a continuation of applicant's co-pending application Serial No. 770,314, filed May 28th, 1913, for demountable rims for vehicle wheels.

In the following is described in connection with the accompanying drawings one embodiment of the invention, the features thereof being more particularly pointed out hereinafter in the claim.

In the drawings Fig. (1) is a side elevation of a rim part thereof being shown in annular section. Fig. (2) is an enlarged sectional view of the rim at a point adjacent the split, illustrating the angular disposition of said split with relation to the angular disposition of the hook on the locking plate; Fig. (3) is a plan view of the under side of the rim adjacent the split therein; Fig. (4) is a modified type of rim locking means; and Fig. (5) is a plan view of the under side of the rim structure embodied in Fig. (4).

Similar numerals of reference indicate similar parts throughout the several views.

In the drawings (1) designates a rim provided with tire reception beads (2) for either the straight side or clincher bead type of tires, and is split transversely thereof at (3), said split (3) being on a pre-determined angular plane. (4) indicates a plate fastened on the underside of rim (1) adjacent split (3) by means of rivets (5) and has formed thereon an upwardly extending hook or lug (6), the edges of which are bent in a greater angular plane or a plane obliquely to the plane of said split (3) and is arranged to enter into and engage hole or slot (7) formed in the opposite split end of said rim (1) adjacent split (3). (8) indicates holes or apertures cut or formed in beads (2) so arranged as to receive suitable pins of a rim breaking tool.

In Fig. 2 of the drawings (9) and (10) indicate lines of angular disposition of the split (3) and hook (6) and walls of slot (7).

Referring to Fig. 4 of the drawings, the structure shown thereon is the same as the general type of structure excepting that hook (6) has formed thereon a rib or offset (11) arranged to engage a shoulder (12) cut in one of the walls of slot (7) the object thereof being in both embodiments of the invention, to lock the rim body at the split (3) against separation radially, circumferentially and transversely in either direction, and maintain said rim locked when carried as a spare with an inflated tire thereon or when applied to a rim supporting means.

It is obvious that the invention may be varied in many ways without departing from the spirit of the invention.

What I claim and desire to secure by Letters Patent of the United States is—

A tire rim of integral continuity provided with continuous reception flanges, being split transversely thereof at one point and having cut therein near said split an aperture provided with a locking shoulder, and a rigid cleat mounted on said rim and projecting beyond one end thereof and provided with a hook having formed thereon a rib arranged to engage the shoulder in said aperture to unite but permit the separation of said rim ends.

In witness whereof I have hereunto signed my name in the presence of two subscribing witnesses.

FREDELLIA H. MOYER.

In presence of—
E. E. WERRY,
R. C. GLAZIER.